United States Patent
Hong et al.

(10) Patent No.: US 9,052,770 B2
(45) Date of Patent: Jun. 9, 2015

(54) TOUCHSCREEN DISPLAY DEVICE AND RELATED METHOD

(71) Applicant: Samsung Display Co., Ltd., Yongin, Gyeonggi-Do (KR)

(72) Inventors: Won-ki Hong, Suwon-si (KR); Seungho Nam, Seongnam-si (KR); Hyeonyong Jang, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 186 days.

(21) Appl. No.: 13/737,676

(22) Filed: Jan. 9, 2013

(65) Prior Publication Data
US 2014/0055406 A1 Feb. 27, 2014

(30) Foreign Application Priority Data

Aug. 24, 2012 (KR) .................. 10-2012-0092914

(51) Int. Cl.
*G06F 3/041* (2006.01)
*G06F 3/042* (2006.01)
*G06F 3/043* (2006.01)

(52) U.S. Cl.
CPC ............ *G06F 3/0414* (2013.01); *G06F 3/0416* (2013.01); *G06F 3/0428* (2013.01); *G06F 3/0433* (2013.01); *G06F 2203/04105* (2013.01)

(58) Field of Classification Search
CPC ... G06F 3/0414; G06F 3/0421; G06F 3/0428; G06F 2203/04105
USPC ..................... 345/173–179; 178/18.01–18.09
See application file for complete search history.

(56) References Cited

U.S. PATENT DOCUMENTS

| 7,786,983 | B2 | 8/2010 | Graham | |
|---|---|---|---|---|
| 8,139,045 | B2 | 3/2012 | Jang et al. | |
| 2004/0125086 | A1* | 7/2004 | Hagermoser et al. | 345/173 |
| 2010/0060612 | A1 | 3/2010 | Jeon et al. | |
| 2010/0085330 | A1 | 4/2010 | Newton | |
| 2010/0134445 | A1* | 6/2010 | Cho et al. | 345/175 |
| 2010/0315360 | A1* | 12/2010 | Lee | 345/173 |
| 2010/0315383 | A1 | 12/2010 | Chang et al. | |
| 2010/0328267 | A1 | 12/2010 | Chen | |
| 2011/0141062 | A1* | 6/2011 | Yu et al. | 345/175 |
| 2011/0148819 | A1 | 6/2011 | Yu | |

(Continued)

FOREIGN PATENT DOCUMENTS

| KR | 100913758 | 8/2009 |
|---|---|---|
| KR | 10-2009-0116544 | 11/2009 |

(Continued)

*Primary Examiner* — Premal Patel
(74) *Attorney, Agent, or Firm* — Innovation Counsel LLP

(57) ABSTRACT

A display device includes a display element. The display device may include a touch substrate overlapping the display element and may overlap an external object when the external object provides a touch to the display device. The display device may include a first angle sensor disposed at a first corner of the touch substrate for determining a first touch angle related to the touch. The display device may include a second angle sensor disposed at a second corner of the touch substrate for determining a second touch angle related to the touch. The display device may include a force sensor disposed at the first corner of the touch substrate for determining a distance related to the touch. The display device may include a computation part configured to determine a touch coordinate associated with the touch based on the first touch angle, the second touch angle, and the distance.

23 Claims, 10 Drawing Sheets

(56) References Cited

U.S. PATENT DOCUMENTS

2011/0148822 A1    6/2011   Jung et al.
2012/0032907 A1*   2/2012   Koizumi et al. .............. 345/173
2012/0105358 A1*   5/2012   Momeyer et al. ............ 345/174
2012/0139878 A1*   6/2012   Tsang et al. ................. 345/175
2012/0327020 A1*  12/2012   Kohara et al. ................ 345/174

FOREIGN PATENT DOCUMENTS

| KR | 10-2010-0132141 | 12/2010 |
| KR | 10-2010-0133959 | 12/2010 |
| KR | 10-2012-0015500 | 2/2012 |
| KR | 10-2012-0027427 | 3/2012 |

\* cited by examiner

TOUCHSCREEN DISPLAY DEVICE AND RELATED METHOD

CROSS-REFERENCE TO RELATED APPLICATIONS

This application claims priority to and benefit of Korean Patent Application No. 10-2012-0092914, filed in the Korean Intellectual Property Office on Aug. 24, 2012, the entire contents of which are incorporated herein by reference.

BACKGROUND

The invention is related to a touchscreen display device and is related to a method for operating the display device.

Generally, a touchscreen display device may include a touch screen panel for sensing one or more points of contact such that a user may provide input by contacting the touch screen panel. A multi-touch display device may sense two or more points of contact simultaneously. There has been substantial market demand for multi-touch display devices with large touch screen panels.

A touch screen panel may be implemented using one or more of a resistive technology, a capacitive technology, a surface acoustic wave technology, an infrared light technology, etc. Typically, resistive technologies and capacitive technologies may be unsuitable for implementing large touch screen panels.

Some surface acoustic wave technologies and some infrared light technologies may be suitable for implementing large touch screen panels. Nevertheless, face acoustic wave technologies and infrared light may not be able to provide multi-touch capability with desirable precision. For providing desirable multi-touch functionality, a large touch screen panel implemented using a face acoustic technology or an infrared light technology may require an additional device for supplementing the multi-touch capability. The additional device may substantially increase the costs of the touch screen panel and/or the display device.

Although a conventional touch screen panel implemented using one or more conventional technologies may be able to sense existence of a touch, the conventional touch screen panel may not be able to determine a magnitude of a force associated with the touch.

SUMMARY

One or more embodiments of the invention may be related to display device that includes a display element configured to affect light transmission for changing displayed images. The display device may further include a touch substrate overlapping the display element and may overlap one or more objects that are external to the display device when the one or more objects provide at least a touch to the display device at a touch point. The display device may further include a first angle sensor disposed at a first corner of the touch substrate for determining a first touch angle related to the touch. The display device may further include a second angle sensor disposed at a second corner of the touch substrate for determining a second touch angle related to the touch. The display device may further include a force sensor disposed at the first corner of the touch substrate for determining a distance related to the touch. The display device may further include a computation part configured to determine a touch coordinate associated with the touch based on the first touch angle, the second touch angle, and the distance.

In one or more embodiments, the force sensor is further configured to calculate a magnitude of a sensor force received at the force sensor, and wherein at least one of the force sensor and the computation part is further configured to calculate a magnitude of a touch force received at the touch point and related to the touch based on the distance and the sensor force.

In one or more embodiments, the first angle sensor includes an infrared camera, and the infrared camera comprises a light output portion for outputting an output infrared light and a light input portion for receiving a reflected infrared light that is resulted from the output infrared light.

In one or more embodiments, the force sensor may include the following elements: a sensor resistor having a resistance that is configured to vary according to a sensor force received at the sensor resistor; a filter resistor having a constant resistance value and connected in series to the sensor resistor; and a force sensing part connected to a node that is connected between the sensor resistor and the filter resistor, wherein the sensor resistor and the filter resistor are configured for dividing a reference voltage to provide a division voltage at the node, and wherein the force sensing part is configured to determine the sensor force using a value of the a division voltage.

In one or more embodiments, the force sensor is configured to determine an arrival time of a surface acoustic wave generated by the first touch, wherein the first angle sensor is configured to determine a touch time when the touch is provided to the display device, and the display device is configured to determine the distance using the arrival time, the touch time, and a transfer speed of the surface acoustic wave.

In one or more embodiments, the first angle sensor overlaps the force sensor in a direction perpendicular to a surface of the touch substrate that overlaps the one or more objects.

In one or more embodiments, the display device may include a frame disposed on the touch substrate, having an opening, and including an inner wall for reflecting infrared light provided by at least one of the first angle sensor and the second angle sensor.

In one or more embodiments, the frame includes a cavity, and the first angle sensor is disposed inside the cavity.

In one or more embodiments, the display device may include a reflection plate disposed at the inner wall for reflecting the infrared light.

In one or more embodiments, the display device may include a supporter disposed at the second corner of the touch substrate, wherein a height of the supporter is equal to a height of the force sensor.

In one or more embodiments, the computation part may include the following elements: a candidate coordinate calculator configured to calculate a first candidate coordinate related to the touch using two of the first touch angle, the second touch angle, and the distance, the candidate coordinate calculated being further configured to calculate a second candidate coordinate; a coordinate calculator configured to select the touch coordinate from the first candidate coordinate and the second candidate coordinate using the remaining one of the first touch angle, the second touch angle, and the touch distance; and a touch force calculator configured to calculate the touch force based on the touch distance and the sensor force.

In one or more embodiments, the candidate coordinate calculator is configured to calculate the first candidate coordinate using the first touch angle, a cosine function, a sine function, and the distance, and wherein the candidate coordinate calculator is configured to calculate the second candidate coordinate using a third touch angle, the cosine function, the sine function, and the distance.

In one or more embodiments, the coordinate calculator is configured to select the touch coordinate from the first candidate coordinate and the second candidate coordinate using the second touch angle.

In one or more embodiments, the candidate coordinate calculator is configured to calculate the first candidate coordinate using the first touch angle, the second touch angle, and a tangent function, and the candidate coordinate calculator is configured to calculate the second candidate coordinate using a third touch angle, the second touch angle, and the tangent function.

In one or more embodiments, the coordinate calculator is configured to select the touch coordinate from the first candidate coordinate and the second candidate coordinate using the distance.

In one or more embodiments, the displace elements are included in a display panel, wherein the touch substrate is spaced from the display panel and overlaps the display panel, and wherein the force sensor is disposed between the touch substrate and the display panel.

In one or more embodiments, the display device may include a base substrate, wherein the display element is disposed between the touch substrate and the base substrate, and wherein the force sensor is disposed between the touch substrate and the base substrate.

In one or more embodiments, the first angle sensor is external to the touch substrate and overlaps the base substrate in a direction perpendicular to the base substrate.

In one or more embodiments, the display device may include a polarization plate overlapping the touch substrate, wherein a space between the touch substrate and the polarization plate is filled with air.

In one or more embodiments, the display device may include a reflection layer including a first portion disposed at and overlapping a first surface of the touch substrate and disposed between the touch substrate and the base substrate for reflecting a first part of an infrared light provided by the first angle sensor.

In one or more embodiments, the reflection layer further includes a second portion substantially perpendicular to the first portion and overlapping a second surface of the touch substrate for reflecting a second part of an infrared light provided by the first angle sensor.

One or more embodiment of the invention may be related to a method for operating a display device. The method may include sensing, using a first angle sensor, a first touch angle related to a touch. The method may further include sensing, using a second angle sensor, a second touch angle related to the touch. The method may further include determining a distance related to the touch and related to a force sensor. For example, the distance may be substantially equal to the distance between the touch point and the force sensor. The method may further include determining a magnitude of a sensor force related to the touch and received at the force sensor. The method may further include determining, using a computation part, a touch coordinate related to the touch using the first touch angle, the second touch angle, and the distance. The method may further include determining, using at least one of the computation part and the force sensor, a magnitude of a touch force related to the touch using the magnitude of the sensor force and the distance.

In one or more embodiments, the method may further include the following steps: calculating a first candidate coordinate using the computation part and two of the first touch angle, the second touch angle, and the distance without using a remaining one of the first touch angle, the second touch angle, and the distance; calculating a second candidate coordinate using at least the computation part; and selecting the touch coordinate from the first candidate coordinate and the second candidate coordinate using the computation part and the remaining one of the first touch angle, the second touch angle, and the distance.

One or more embodiments of the invention may be related to a touch display device that comprises a display panel and a touch screen panel disposed at an upper part of the display panel and configured to sense at least one touch. The touch screen panel may include the following elements: a touch substrate at which the touch is generated; a first angle sensor disposed at a first edge on the touch substrate and configured to sense a first touch angle of the touch; a second sensor disposed at a second edge, different from the first edge, on the touch substrate and configured to sense a second touch angle of the touch; a force sensor disposed to correspond to the first or second edge of the touch substrate and between the touch substrate and the display panel and configured to calculate a touch distance being a distance up to the touch; and a computation part configured to calculate a touch coordinate based on the first touch angle, the second touch angle, and the touch distance.

The force sensor is further configured to calculate a sensor force being a force applied by the touch and the computation part is further configured to calculate a touch force based on the touch distance and the sensor force.

Each of the first and second angle sensors includes an infrared camera.

The force sensor comprises a sensor resistor having a resistance value varied according to the force applied by the touch; a filter resistor having a constant resistance value and connected in series with the sensor resistor; and a force sensing part connected to a node between the sensor resistor and the filter resistor. A reference voltage is divided by the sensor resistor and the filter resistor and the force sensing part calculates the touch distance and the sensor force based on a division voltage on the node.

The computation part comprises a candidate coordinate calculator configured to determine whether the touch is a single touch or a multi-touch and to calculate a candidate coordinate of the touch using two of the first touch angle, the second touch angle, and the touch distance; a coordinate calculator configured to extract the touch coordinate of the candidate coordinates using the remaining one of the first touch angle, the second touch angle, and the touch distance; and a touch force calculator configured to calculate the touch force based on the touch distance and the sensor force.

One or more embodiments of the invention may be related to a touch display device comprising a display panel, a first angle sensor, a second angle sensor, a force sensor, and a computation part.

The display panel includes a lower substrate, an upper substrate opposed to the lower substrate, and an image display layer disposed between the lower substrate and the upper substrate.

The first angle sensor may be spaced apart from the first angle sensor, and may be disposed in parallel with the upper substrate.

The force sensor is disposed between the upper substrate and the lower substrate.

One more embodiments of the invention may be related to a touch coordinate and touch force calculating method performed in a touch display device. The method may include the following steps: sensing a first touch angle, a second touch angle, a touch distance, and a sensor force associated with at least one touch generated by a user; determining whether the touch is a single touch or a multi-touch; calculating a touch coordinate and a touch force when the touch is the single touch; and calculating touch coordinates and touch forces when the touch is the multi-touch.

BRIEF DESCRIPTION OF THE FIGURES

The above and other objects and features will become apparent from the following description with reference to the following figures, wherein like reference numerals may refer to like parts throughout the various figures unless otherwise specified, and wherein.

DETAILED DESCRIPTION

Figure 1:
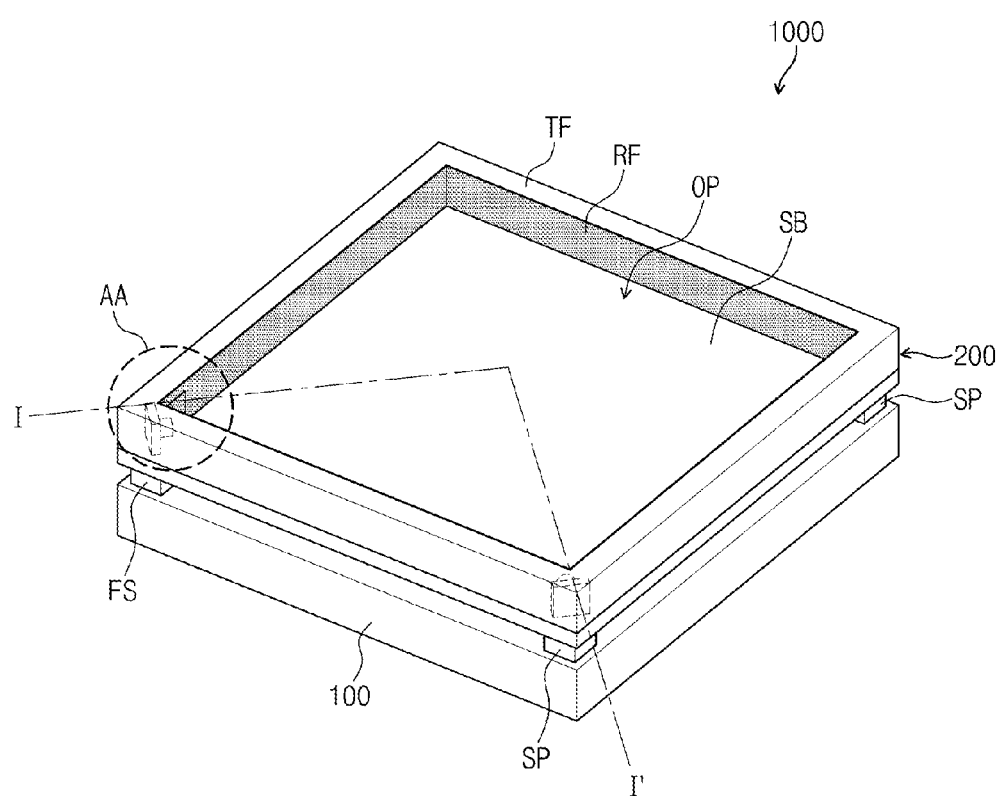
FIG. 1 is a perspective view of illustrating touchscreen display device according to one or more embodiments of the invention.

Embodiments will be described in detail with reference to the accompanying drawings. The invention, however, may be embodied in various different forms, and should not be construed as being limited only to the illustrated embodiments. These embodiments are provided as examples so that this disclosure will be thorough and complete, and will fully convey the concept of the invention to those skilled in the art. Known processes, elements, and techniques may not be described with respect to some of the embodiments of the invention. Unless otherwise noted, like reference numerals may denote like elements throughout the attached drawings and written description, and thus descriptions may not be repeated. In the drawings, the sizes and relative sizes of layers and regions may be exaggerated for clarity. Various embodiments are described herein below, including methods and techniques. Embodiments of the invention might also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Although the terms "first", "second", "third", etc., may be used herein to describe various signals, elements, components, regions, layers, and/or sections, these signals, elements, components, regions, layers, and/or sections should not be limited by these terms. These terms may be used to distinguish one element, component, region, layer, or section from another region, layer, or section. Thus, a first element, component, region, layer, or section discussed below could be termed a second element, component, region, layer, or section without departing from the teachings of the invention. The description of an element as a "first" element may not require or imply the presence of a second element or other elements. The terms first, second, third etc. may also be used herein to differentiate different categories of elements. For conciseness, the terms first, second, third, etc. may represent first-category, second-category, third-category, etc., respectively.

Spatially relative terms, such as "beneath", "below", "lower", "under", "above", "upper", etc., may be used herein for ease of description to describe one element or feature's relationship to another element(s) or feature(s) illustrated in the figures. The spatially relative terms may be intended to encompass different orientations of the device in use or operation in addition to the orientation depicted in the figures. For example, if the device in the figures is turned over, elements described as "below", "beneath", or "under" other elements or features would then be oriented "above" the other elements or features. Thus, the terms "below" and "under" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

The terminology used herein may be for the purpose of describing particular embodiments only and is not intended to be limiting of the inventive concept. As used herein, the singular forms "a", "an", and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups. As used herein, the term "and/or" may include the possibilities of any and all combinations of one or more of the associated listed items. The term "exemplary" may be intended to refer to an example or illustration.

When an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present (except possible environmental elements such as air).

Unless otherwise defined, all terms (including technical and scientific terms) used herein have the same meaning as commonly understood by one of ordinary skill in the art to which this invention pertains. Terms, such as those defined in commonly used dictionaries, should be interpreted as having a meaning that is consistent with their meaning in the context of the relevant art and/or the present specification and should not be interpreted in an idealized or overly formal sense unless expressly so defined herein.

Figure 2:
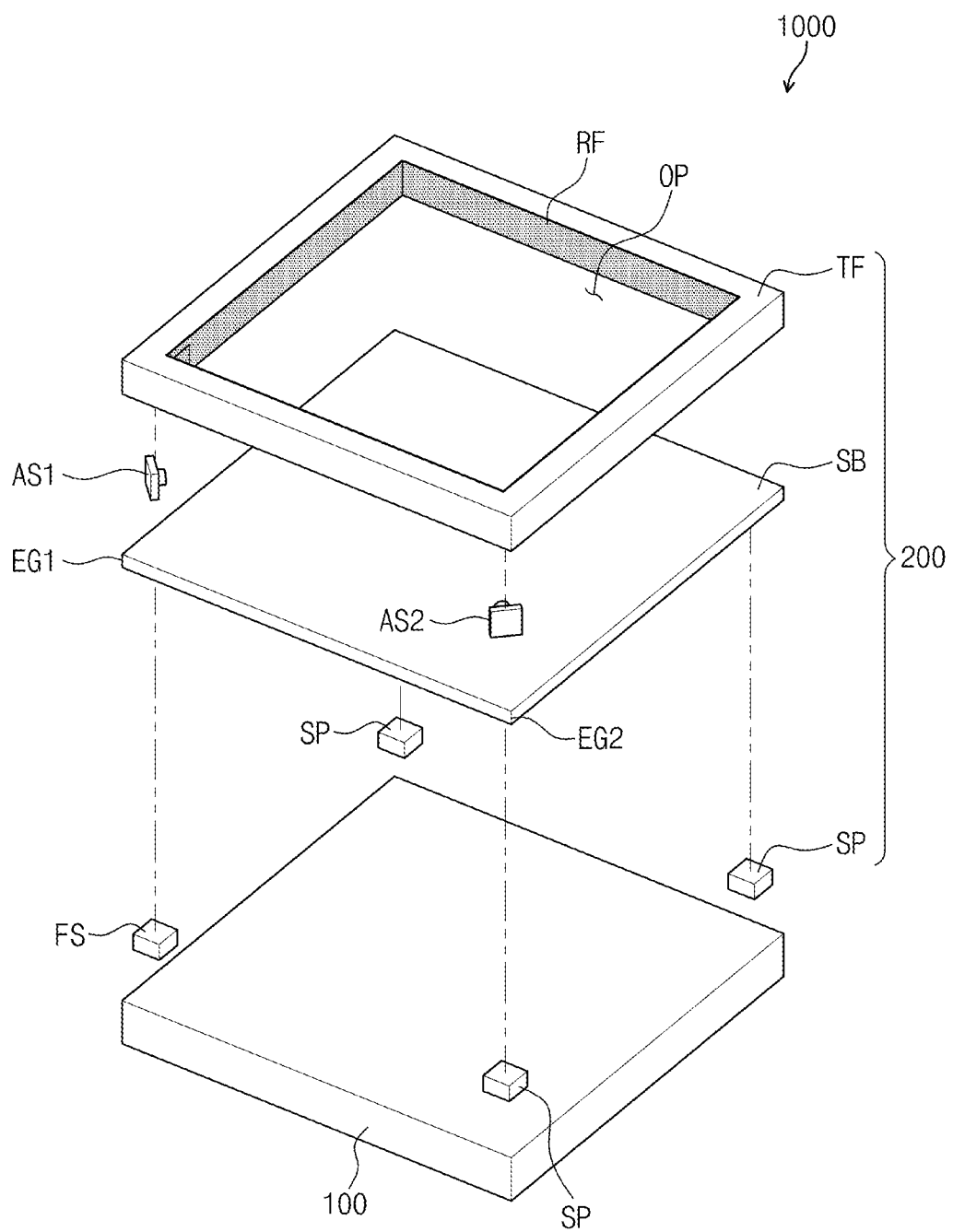
FIG. 2 is an exploded view illustrating the touchscreen display device illustrated in FIG. 1.
Figure 3:
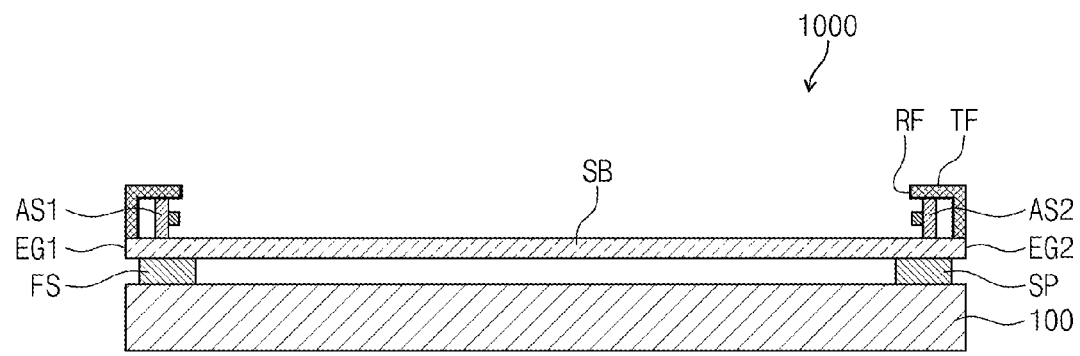
FIG. 3 is a cross-sectional view taken along a line I-I' indicated in FIG. 1.
Figure 4:
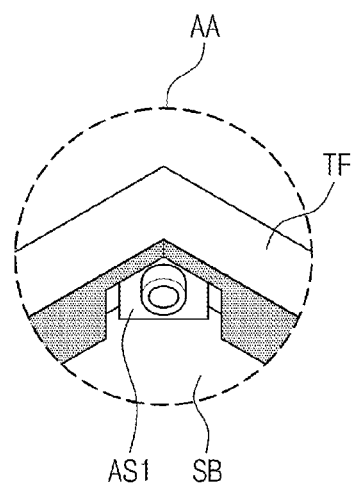
FIG. 4 is an enlarged view of a region AA indicated in FIG. 1.

FIG. 1 is a perspective view illustrating a touchscreen display device 1000 according to one or more embodiments of the invention. FIG. 2 is an exploded view illustrating the touchscreen display device 1000 illustrated in FIG. 1. FIG. 3 is a cross-sectional view taken along a line I-I' indicated in FIG. 1. FIG. 4 is an enlarged view of a region AA indicated in FIG. 1.

Referring to FIGS. 1 to 3, the touchscreen display device 1000 (or display device 1000) may include a display panel 100 and a touch screen panel 200.

The display panel 100 may display images. The display panel 100 may include one or more of a variety of display panels such as a liquid crystal display panel, an organic light emitting display panel, a plasma display panel, an electrophoretic display panel, an electro-wetting display panel, and so on.

A shape of the display panel 100 in a plane view of the display device 1000 may not be limited to a specific shape. In FIGS. 1 to 3, as an example, a shape of the display panel 100 may be rectangular in a plane view of the display device 1000.

The touch screen panel 200 may include a touch substrate SB, a first angle sensor AS1, a second angle sensor AS2, a force sensor FS, and a computation part (not shown) electrically connected to one or more of the sensors.

A touch of a user may be received at (or through) a contact surface of the touch substrate SB. The touch substrate SB may have non-directionality with respect to a surface acoustic wave and may be formed of a low isotropic attenuation coefficient material. For example, the touch substrate SB may be formed of one or more of glass, polymer, ceramic, and so on.

The touch substrate SB may have a plate shape, e.g., a prism shape and/or a cuboid (or rectangular prism) shape. In a plan view of the display device 1000, the touch substrate SB may have a shape corresponding to a shape of the display panel 100. In FIGS. 1 to 3, as an example, a shape of the touch substrate SB is rectangular in a plane view of the display device 1000. The contact surface of the touch substrate SB may be rectangular.

The first angle sensor AS1 may be disposed at a corner and/or an edge of the touch substrate SB. As illustrated in FIGS. 1 to 3, the first angle sensor AS1 is disposed to correspond to a first corner of the contact surface of touch substrate SB and/or correspond to a first edge EG1 of the cuboid shape of the touch substrate SB.

The second angle sensor AS2 may be disposed at a corner and/or an edge of the touch substrate SB, and may be spaced apart from the first angle sensor AS1. The second angle sensor AS2 may be disposed to correspond to a second corner of the contact surface of touch substrate SB and/or correspond to a second edge EG2 of the cuboid shape of the touch substrate SB. The second edge EG2 may be adjacent to the first edge EG1. The first edge EG1 and the second edge EG2 may represent two opposite edges of a face (or side surface) of the cuboid shape of the touch substrate SB.

Each of the angle sensors AS1 and AS2 may include an infrared camera.

The infrared camera may include a light output portion and a light input portion.

The light output portion may have an angle of view set to be parallel to a surface of the touch substrate SB and may output an infrared light within the angle of view. The output infrared light may progress parallel to the touch substrate SB on the touch substrate SB.

The light input portion may receive a (reflected) part of the infrared light output from the light output portion.

If the contact surface (e.g., the upper side) of the touch substrate SB is touched by a user, a progress path of the output infrared light may be blocked by the touch of the user. The amount of (reflected) infrared light received by the light input portion at an angle where the touch is made may be substantially (and/or rapidly) reduced.

A touch and a touch angle may be sensed by comparing the amount of infrared light output from the light output portion within the angle of view with the amount of (reflected) infrared light received by the light input portion. In one or more embodiments, as discussed above, each of the first and second angle sensors AS1 and AS2 includes an infrared camera having a light output portion and a light input portion. In one or more embodiments, the touch screen panel 200 may include a first infrared output element, a first infrared input element, a second infrared output element, and a second infrared input element. The first infrared output element, the first infrared input element, the second infrared output element, and the second infrared input element may be provided at four edges of the touch substrate SB, respectively. The first infrared output element and the second infrared output element may perform a task analogous to that of the light output portion. The first infrared input element and the second infrared input element may perform a task analogous to that of the light input portion.

The force sensor FS may be disposed at a corner (and/or an edge) of the touch substrate SB and may be disposed between the touch substrate SB and the display panel 100. The force sensor FS may overlap one of the first and second angle sensors AS1 and AS2. In FIGS. 1 to 3, as an example, the force sensor FS overlaps the first angle sensor AS1.

The touch screen panel 200 may further include a touch frame TF.

The touch frame TF may be disposed on the touch substrate SB. The touch frame TF may have an opening OP, and may have a shape overlapping and/or surrounding a border of the touch substrate SB.

The angle sensors AS1 and AS2 may be disposed and/or secured inside the touch frame TF.

Referring to FIGS. 3 and 4, the touch frame TF may have a first cavity corresponding to the first corner and/or the first edge EG1 of the touch substrate SB, and the first angle sensor AS1 may be disposed inside the first cavity. Analogously, the touch frame TF may have a second cavity corresponding to the second corner and/or the second edge EG2 of the touch substrate SB, and the second angle sensor AS2 may be disposed inside the second cavity.

Referring to FIGS. 1 to 3, the touch screen panel 200 may further include a reflection plate RF.

The reflection plate RF may be disposed along an inner wall of the touch frame TF. The reflection plate RF may reflect an infrared light output from the light output portion such that at least a portion of the reflected infrared light may be received by the light input portion.

The touch screen panel 200 may further include a supporter SP.

The supporter SP may be spaced apart from the force sensor FS and may be disposed between the touch substrate SB and the display panel 100. The supporter SP may be disposed to correspond to a corner and/or an edge of the touch substrate SB.

The touch screen panel 200 may include a plurality of supporters SP. Each of the supporters may have the same height as the force sensor FS. In FIGS. 1 to 3, as an example, three supporters are disposed at three corners and/or at three edges of the touch substrate SB but not disposed at the first corner or the first edge EG1, wherein the force sensor FS is disposed.

The supporter SP may be used to prevent distance variation between the touch substrate SB and the display panel 100 given the existence of the force sensor FS.

In one or more embodiments, the computation part (illustrated in FIG. 5) may include a chip mounted on the touch screen panel 200. Alternatively or additionally, the computation part may be disposed on a printed circuit board that is connected to the touch screen panel 200.

Figure 5:
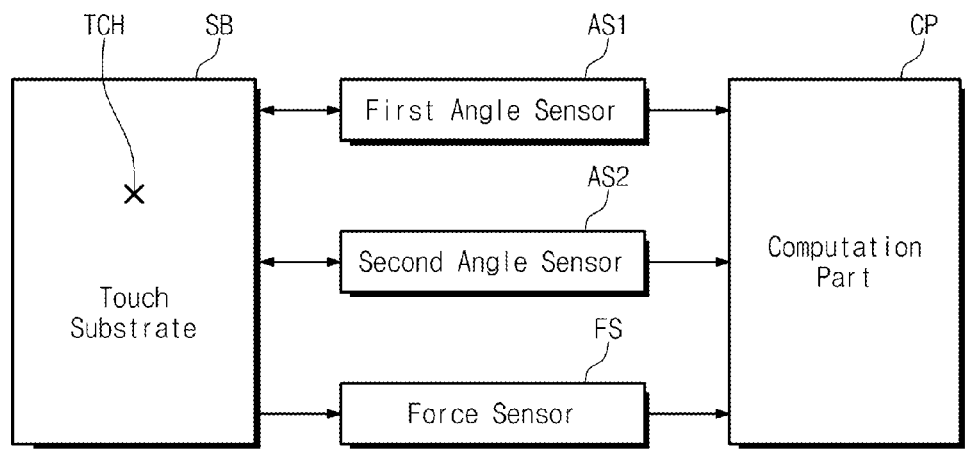
FIG. 5 is a block diagram schematically illustrating a touch screen panel according to one or more embodiments of the invention.

FIG. 5 is a block diagram schematically illustrating a touch screen panel (e.g., the touch screen panel 200 discussed with reference to FIGS. 1 to 4) according to one or more embodiments of the invention.

Referring to FIG. 5, if a touch TCH by a user is received at a touch substrate SB, a first angle sensor AS1 may sense a first touch angle of the touch TCH and may provide the first touch angle to the computation part CP. A second angle sensor AS2 may sense a second touch angle of the touch TCH and may provide the second touch angle to the computation part CP. A force sensor FS may calculate a touch distance (i.e., a distance between the force sensor FS and the touch TCH), may calculate the magnitude a sensor force (i.e., the magnitude of a force received by the force sensor FS), and may provide data related to the touch distance and the sensor force to the computation part CP.

The computation part CP may compute a touch coordinate and a magnitude of a touch force based on the first touch angle, the second touch angle, the distance data, and the force data.

Figure 6:
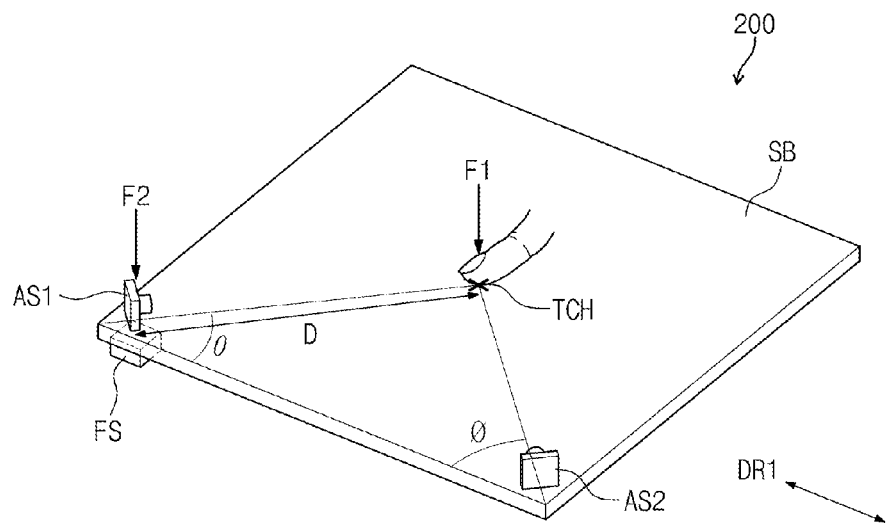
FIG. 6 is a diagram illustrating that a touch screen panel receives a single touch according to one or more embodiments of the invention.

FIG. 6 is a diagram illustrating that a touch screen panel receives a single touch according to one or more embodiments of the invention.

The first angle sensor AS1 and the second angle sensor AS2 according to one or more embodiments of the invention are discussed with reference to FIG. 6.

Each of the first angle sensor AS1 and the second angle sensor AS2 may have a view angle (i.e., an angle range that a sensor is capable of receiving signals) of 90 degrees. Since the first angle sensor AS1 and the second angle sensor AS2 are disposed at two adjacent corners (and/or edges) of the touch substrate SB, signals received at the whole contact surface of the touch substrate SB may be detected.

Each of the first angle sensor AS1 and the second angle sensor AS2 may continuously (and/or sequentially) output infrared light beams to scan various angles with respect to a first side of the contact surface of the touch substrate SB within its view angle range, wherein both the angle sensors AS1 and AS2 are disposed at the first side of the touch substrate SB. If the touch substrate SB is touched, given that a substantial portion of the reflected infrared light may be blocked by a figure of the user, the amount of infrared light received by the first angle sensor AS1 may be substantially reduced at a first angle with respect to the first side of the touch substrate SB, and the amount of infrared light received by the second angle sensor AS2 may be substantially reduced at a second angle with respect to the first side of the touch substrate SB. The first angle sensor AS1 and the second angle sensor AS2 may determine the first angle and the second angle as a first touch angle ($\theta$) and a second touch angle ($\Phi$), respectively.

At least one of the first angle sensor AS1 and the second angle sensor AS2 may record a point of time when at least one of the first touch angle ($\theta$) and the second touch angle ($\Phi$) is sensed as the time when the touch TCH is made.

The first touch angle ($\theta$) may be defined as an acute angle between a first direction DR1 (aligned with or parallel to the first side of the touch substrate SB) and a direction in which the touch TCH is seen from the first angle sensor AS1. The second touch angle ($\Phi$) may be defined as an acute angle between the first direction DR1 (aligned with or parallel to the first side of the touch substrate SB) and a direction in which the touch TCH is seen from the second angle sensor AS2.

Figure 7:
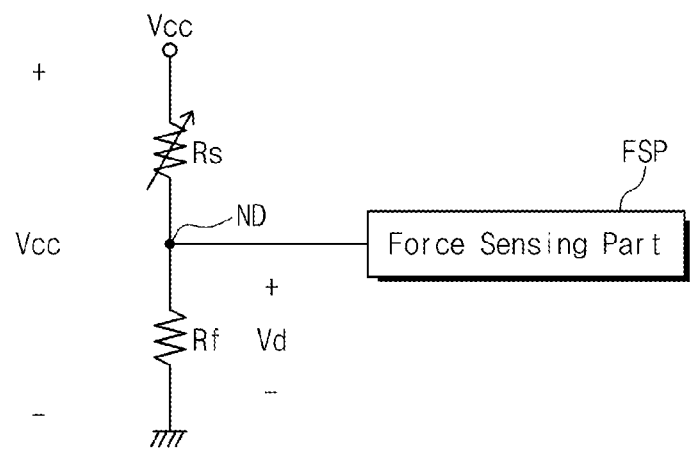
FIG. 7 is a circuit diagram schematically illustrating a force sensor according to one or more embodiments of the invention.

FIG. 7 is a circuit diagram schematically illustrating a force sensor (e.g., the force sensor FS discussed with reference to FIGS. 1-6) according to one or more embodiments of the invention.

The force sensor FS may include a sensor resistor Rs, a filter resistor Rf, and a force sensing part FSP.

The sensor resistor Rs may include a piezoresistive material, and a resistance value of the sensor resistor Rs may vary when a force is applied to the sensor resistor Rs. For example, the piezoresistive material may include one or more of carbon nanotube (CNT), graphene, etc.

The filter resistor Rf may be electrically connected in series to the sensor resistor Rs and may have a constant resistance value.

In FIG. 7, as an example in, which an end of the sensor resistor Rs is connected to receive a reference voltage Vcc, the other end of the sensor resistor Rs and an end of the filter resistor Rf are connected at a connection node ND and are connected to the force sensing part FSP, and the other end of the filter resistor Rf is grounded.

The force sensing part FSP may be connected to the connection node ND that is connected between the sensor resistor Rs and the filter resistor Rf. The force sensing part FSP may sense a division voltage Vd obtained by dividing the reference voltage Vcc using the resistors Rs and Rf. The division voltage Vd may vary according to a resistance value of the sensor resistor Rs.

The division voltage Vd may be determined according to the following equation set 1.

$$Vd = Vcc \times \frac{Rf}{Rf + Rs}$$

In the equation set 1, Vd may represent the division voltage, Vcc may represent the reference voltage, Rf may represent the resistance value of the filter resistor Rf, and Rs may represent the resistance value of the sensor resistor Rs.

Referring to FIGS. 6 and 7, the force sensing part FSP may calculate a touch distance D (between the touch point and the force sensor FS) based on a point of time when the division voltage Vd varies, and the force sensing part FSP may calculate a sensor force F2 based on the division voltage Vd, as further described below.

If a touch TCH is made by a user, a surface acoustic wave may be generated at a touch position and may propagate along the touch substrate SB. In one or more embodiments, a transfer speed of the surface acoustic wave may be constant at the same medium. In one or more embodiments, a transfer speed of the surface acoustic wave may be determined by a material of the touch substrate SB and may not be affected by the touch force F1.

In one or more embodiments, the touch substrate SB is formed of a substantially homogeneous material, the transfer speed of the surface acoustic wave may be constant. The touch distance D may be expressed by the following equation set 2.

$$D = v \times \Delta t$$

In the equation set 2, D may represent the touch distance, v may represent the transfer speed of a surface acoustic wave, and $\Delta t$ may represent the time length for the surface acoustic wave to reach a force sensor.

The time length may be calculated using a time between a point of time when the division voltage Vd sensed by the force sensing part FSP varies and a point of time of the touch TCH recorded by at least one of the angle sensors AS1 and AS2.

A method performed by the force sensor FS for generating the sensor force F2 (or the force data) according to one or more embodiments is discussed as follows.

The sensor force F2 may be a force applied to the force sensor FS as a result of a touch force F1 applied to the touch substrate SB by a user. If the touch distance D is not zero, the sensor force F2 may be smaller than the touch force F1.

The force sensing part FSP may determine the magnitude of the sensor force F2 based on the division voltage Vd.

For example, in the case that no force is applied to the force sensor FS, a resistance value of the sensor resistor Rs may be assumed to be infinite. In the case that an infinite force is applied to the force sensor FS, a resistance value of the sensor resistor Rs may be assumed to be zero. The division voltage Vd may vary between 0V and Vcc according to variation in the resistance value of the sensor resistor Rs.

In one or more embodiments, the force sensing part FSP may include a lookup table that may include force values respectively corresponding to voltage values between 0V and Vcc. The force sensing part FSP may read a sensor force F2 that corresponds to the division voltage Vd from the lookup table. In one more embodiments, a mathematical function defining the relation between the sensor force F2 and the division Vd may be implemented in the force sensing part FSP, and the force sensing part FSP may be configured to calculate the sensor force F2 using the mathematical function and using the division voltage Vd as an input for the mathematical function.

Figure 8:
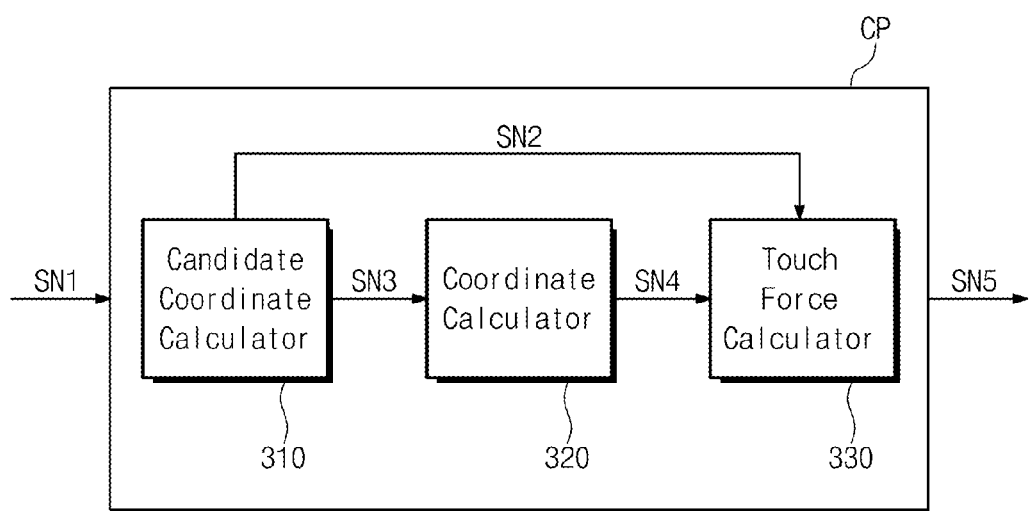
FIG. 8 is a block diagram schematically illustrating a computation part according to one or more embodiments of the invention.

FIG. 8 is a block diagram schematically illustrating a computation part (such as the computation part CP) according to one or more embodiments of the invention.

Referring to FIG. 8, the computation part CP may include a candidate coordinate calculator 310, a coordinate calculator 320, and a touch force calculator 330.

The computation part CP may receive a first signal SN1 that may include the following data: a first touch angle, a second touch angle, a touch distance, and (the magnitude of) a sensor force as. The computation part CP may calculate a touch coordinate and (the magnitude of) a touch force based on the first signal SN1. The computation part CP may output a calculation result as a fifth signal SN5. The display panel 100 illustrated in FIGS. 1 to 3 may receive the fifth signal SN5 and may make changes to the displayed image based on at least one of the touch coordinate and the touch force magnitude.

The candidate coordinate calculator 310 may determine whether a single touch or a plurality of simultaneously touches is received. The candidate coordinate calculator 10 may calculate one or more candidate coordinates using two of the first touch angle(s), the second touch angle(s), and the touch distance(s).

In the case that a single touch is received, the candidate coordinate calculator 310 may calculate a candidate coordinate of the touch and may designate the candidate coordinate as a touch coordinate, i.e., an actual coordinate of the touch. The candidate coordinate calculator 310 may provide the touch force calculator 330 with a second signal SN2 that includes information on the candidate coordinate.

In the case that a plurality of simultaneous touches is received, the candidate coordinate calculator 310 may calculate a plurality of candidate coordinates and may provide the coordinate calculator 320 with a third signal SN3 that includes information on the candidate coordinates.

The coordinate calculator 320 may extract a touch coordinate, i.e., an actual coordinate of the touch, from the candidate coordinates using the remaining one of the first touch angle(s), the second touch angle(s), and the touch distance(s). The coordinate calculator 320 may provide the touch force calculator 330 with a fourth signal SN4 that includes information on the touch coordinate.

The touch force calculator 330 may receive the second signal SN2 or the fourth signal SN4. The touch force calculator 330 may calculate (the magnitude of) the touch force applied to the touch coordinate using (the magnitude of) the sensor force and the touch distance.

A method related to multi-touch (i.e., a plurality of simultaneous touches) and performed by the computation part CP according to one or more embodiments of the invention is described with reference to FIGS. 8 and 9.

Figure 9:
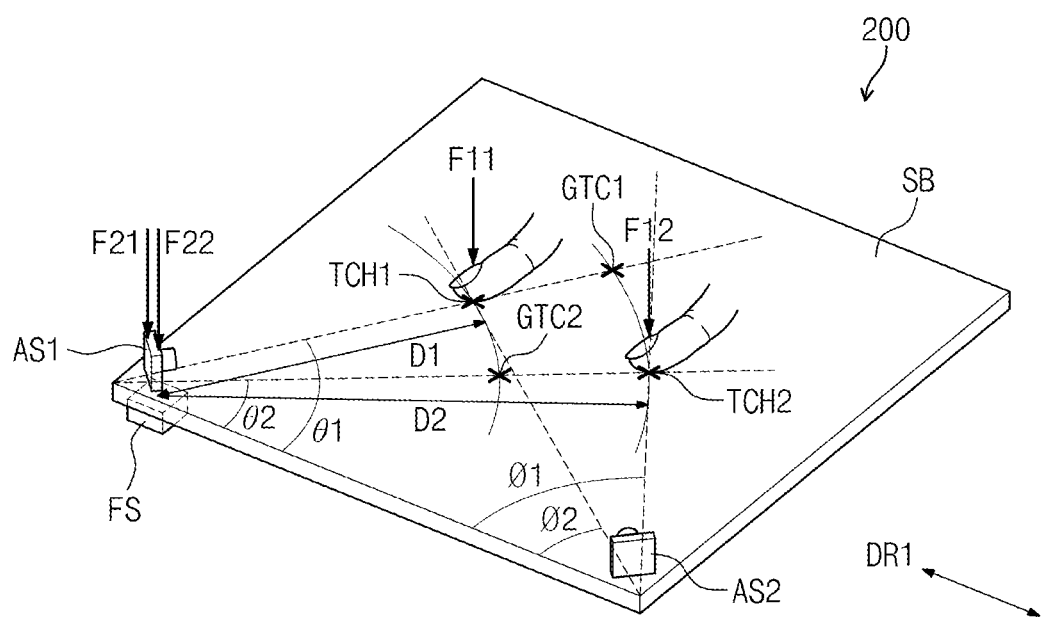
FIG. 9 is a diagram illustrating that a touch screen panel receives multiple touches (or a plurality of touches) simultaneously according to one or more embodiments of the invention.

FIG. 9 is a diagram illustrating that a touch screen panel receives a plurality of simultaneous touches according to one or more embodiments of the invention. In FIG. 9, as an example, a first touch TCH1 and a second touch TCH2 are made by a user.

The first angle sensor AS1 may sense two first touch angles $\theta 1$ and $\theta 2$. The first touch angle of the first touch TCH1 may be referred to as a first angle $\Phi 1$, and the first touch angle of the second touch TCH2 may be referred to as a second angle $\theta 2$.

A second angle sensor AS2 may sense two second touch angles $\Phi 1$ and $\Phi 2$. The second touch angle of the second touch TCH2 may be referred to as a third angle $\Phi 1$, and the second touch angle of the first touch TCH1 may be referred to as a fourth angle $\Phi 2$.

A force sensor FS may calculate a first touch distance D1 (i.e., a distance between the force sensor FS and the first touch TCH1) and a second touch distance D2 (i.e., a distance between the force sensor FS and the second touch TCH2). A first touch force F11 may be applied through the first touch TCH1, and a second touch force F12 may be applied through the second touch TCH2. The force sensor FS may calculate a first sensor force F21 (i.e., a force applied to the force sensor FS given that the first touch force F11 is applied to the touch substrate SB) and a second sensor force F22 (i.e., a force applied to the force sensor FS given that the second touch force F12 is applied to the touch substrate SB).

The candidate coordinate calculator 310 may determine whether a touch conducted by the user is a single touch or a multi-touch (which includes a plurality of simultaneous touches) based on one or more of the number of the first touch angles θ1 and θ2, the number of the second touch angles Φ1 and Φ2, the number of the sensor forces F21 and F22, and the number of the touch distances D1 and D2.

As illustrated in FIG. 9, the number of the first touch angles θ1 and θ2 is 2, the number of the second touch angles Φ1 and Φ2 is 2, the number of the sensor forces F21 and F22 is 2, and the number of the touch distances D1 and D2 is 2. In this case, the candidate coordinate calculator 310 may determine that a plurality of simultaneous touches has been received.

The candidate coordinate calculator 310 may calculate a plurality of candidate coordinates based on at least some of the data mentioned above, e.g., the first touch distance D1, the second touch distance D2, the first angle θ1, and the second angle θ2. The candidate coordinates may include a coordinate of the first touch TCH1, a coordinate of the second touch TCH2, a coordinate of a first ghost touch GTC1, and a coordinate of the second ghost touch GTC2.

A coordinate of the first touch TCH1, a coordinate of the second touch TCH2, a coordinate of a first ghost touch GTC1, and a coordinate of the second ghost touch GTC2 may be calculated according to the following equation set 3.

$$xy1=(D1\cdot\cos(\theta 1)D1\cdot\sin(\theta 1))$$

$$xy2=(D2\cdot\cos(\theta 2)D1\cdot\sin(\theta 2))$$

$$xy3=(D2\cdot\cos(\theta 1)D2\cdot\sin(\theta 1))$$

$$xy4=(D1\cdot\cos(\theta 2)D1\cdot\sin(\theta 2))$$

Herein, xy1 may represent a coordinate of the first touch TCH1, xy2 may represent a coordinate of the second touch TCH2, xy3 may represent a coordinate of a first ghost touch GTC1, and xy4 may represent a coordinate of the second ghost touch GTC2. The position of the force sensor FS may represent the origin (0, 0).

The coordinate calculator 320 may extract the coordinate of the first touch TCH1 and the coordinate of the second touch TCH2 from the candidate coordinates xy1, xy2, xy3, and xy4 using the second touch angles Φ1 and Φ2. In particular, the coordinate calculator 320 may extract the coordinate of the first touch TCH1 using the fourth angle Φ2 and may extract the coordinate of the second touch TCH2 using the third angle Φ1.

Since the first touch TCH1 and the second ghost touch GTC2 share the first touch distance D1 and since the first touch angle of the first touch TCH1 is different from the first touch angle of the second ghost touch GTC2, the second touch angle of the first touch TCH1 may be different from the second touch angle of the second ghost touch GTC2. Analogously, since the second touch TCH2 and the first ghost touch GTC1 share the second touch distance D2 and since the first touch angle of the second touch TCH2 is different from the first touch angle of the first ghost touch GTC1, the second touch angle of the second touch TCH2 may be different from the second touch angle of the first ghost touch GTC1. Thus, the coordinate calculator 320 may exactly extract the coordinate of the first touch TCH1 and the coordinate of the second touch TCH2 from the candidate coordinates xy1, xy2, xy3, and xy4 using the second touch angles Φ1 and Φ2.

The touch force calculator 330 may calculate the first touch force F11 using the first sensor force F21 and the first touch distance D1. The touch force calculator 330 may calculate the second touch force F12 using the second sensor force F22 and the second touch distance D2.

In general, the reduction of the effect of a force applied to a specific point of a surface of a flat plate in a direction perpendicular to the flat plate may be inversely proportional to a square of a distance in a direction parallel to or aligned with the surface of the flat plate. Thus, the first touch distance D1 and the magnitude of the first sensor force F21 may be used to determine the magnitude of the first touch force F11, and the second touch distance D2 and the magnitude of the second sensor force F22 may be used to determine the magnitude of the second touch force F12. The first touch force F11 and the second touch force F12 may be calculated according to the following equation set 4.

$$F11=F21\times(1+a\cdot D1^2)$$

$$F12=F22\times(1+a\cdot D2^2)$$

Herein, F11 may represent the first touch force, F21 may represent the first sensor force, the parameter a may represent a proportional constant, D1 may represent the first touch distance, F12 may represent the second touch force, F22 may represent the second sensor force, and D2 may represent the second touch distance.

A method performed by the computation part CP for determining multi-touch data is described above. When only a single touch is received at the touch substrate SB, since a candidate coordinate calculated by the candidate coordinate calculator 310 coincides with the touch coordinate, the coordinate calculator 320 may not need to extract the touch coordinate from multiple candidates.

With reference to FIG. 9, a method performed by the computation part CP for determining data related to two simultaneously touches TCH1 and TCH2 is discussed. The method performed by the computation part CP may be applied for determining data related to three or more simultaneous touches received at the touch substrate SB.

In a touch display device according to one or more embodiments of the invention, the touch force may be calculated by the computation part CP. In one or more embodiments, the touch force may be calculated by the force sensor FS. The force sensor FS may receive information on a touch coordinate from the computation part CP; the force sensor FS may calculate the touch force based on the touch coordinate, a touch distance, and a sensor force.

A method performed by the computation part CP for determining multi-touch data according to one or more embodiments of the invention is described with reference to FIGS. 8 and 10.

Figure 10:
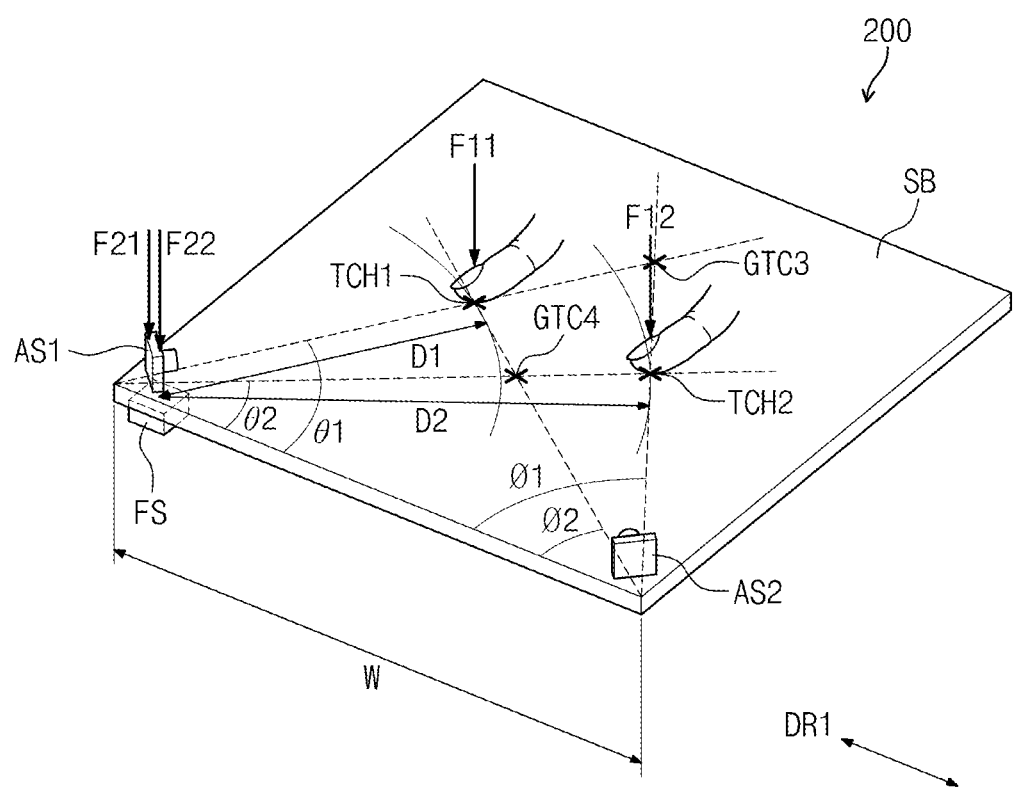
FIG. 10 is a diagram illustrating that a touch screen panel receives multiple touches (or a plurality of touches) simultaneously according to one or more embodiments of the invention.

FIG. 10 is a diagram illustrating that a touch screen panel receives a plurality of simultaneous touches according to one or more embodiments of the invention. In FIG. 10 as an example, a first touch TCH1 and a second touch TCH2 are conducted by a user at the same positions illustrated in FIG. 9. In the discussion with reference to FIG. 10, same components may be marked with the same reference numerals used in FIG. 9 and may have characteristics analogous to those discussed with reference to FIG. 9.

The candidate coordinate calculator 310 may calculate a plurality of candidate coordinates based on the first angle θ1, the second angle θ2, the third angle Φ1, and the fourth angle Φ2. The candidate coordinates may include the coordinate of the first touch TCH1, the coordinate of the second touch TCH2, the coordinate of a third ghost touch GTC3, and the coordinate of a fourth ghost touch GTC4.

The coordinate of the first touch TCH1, the coordinate of the second touch TCH2, the coordinate of the third ghost touch GTC3, and the coordinate of the fourth ghost touch GTC4 may be calculated according to the following equation set 5.

$$xy1 = \left( \frac{-\tan(\Phi 2) \cdot W}{\tan(\theta 1) - \tan(\Phi 2)}, \frac{-\tan(\theta 1) \cdot \tan(\Phi 2) \cdot W}{\tan(\theta 1) - \tan(\Phi 2)} \right)$$

$$xy2 = \left( \frac{-\tan(\Phi 1) \cdot W}{\tan(\theta 2) - \tan(\Phi 1)}, \frac{-\tan(\theta 2) \cdot \tan(\Phi 1) \cdot W}{\tan(\theta 2) - \tan(\Phi 1)} \right)$$

$$xy5 = \left( \frac{-\tan(\Phi 1) \cdot W}{\tan(\theta 1) - \tan(\Phi 1)}, \frac{-\tan(\theta 1) \cdot \tan(\Phi 1) \cdot W}{\tan(\theta 1) - \tan(\Phi 1)} \right)$$

$$xy6 = \left( \frac{-\tan(\Phi 2) \cdot W}{\tan(\theta 2) - \tan(\Phi 2)}, \frac{-\tan(\theta 2) \cdot \tan(\Phi 2) \cdot W}{\tan(\theta 2) - \tan(\Phi 2)} \right)$$

Herein, xy1, xy2, xy5, and xy6 may represent the coordinate of the first touch TCH1, the coordinate of the second touch TCH2, the coordinate of the third ghost touch GTC3, and the coordinate of the fourth ghost touch GTC4, respectively. W may represent a width of the first side of the touch substrate SB, along which the angle sensors AS1 and AS2 are disposed, in a first direction DR1 parallel to or aligned with the first side and parallel to or aligned with the contact surface of the touch substrate SB. A position of the force sensor FS may represent the origin (0, 0). A position of the second angle sensor AS2 may represent (W, 0).

For example, xy1 is a intersecting position of two straight lines, y=tan($\theta 1$)·x and y=tan($\Phi 2$)·x+b. The straight line y=tan($\Phi 2$)·x+b passes through (W, 0), therefore b=−tan($\Phi 2$)·W. Therefore, xy1 is determined by calculating the intersecting position of two straight lines, y=tan($\theta 1$)·x and y=tan($\Phi 2$)·x−tan($\Phi 2$)·W.

The width of the touch substrate SB in the first direction DR1 may have a predetermined value.

The coordinate calculator 320 may extract a coordinate of the first touch TCH1 and the coordinate of the second touch TCH2 from the candidate coordinates xy1, xy2, xy5, and xy6 using the touch distances D1 and D2. In particular, the coordinate calculator 320 may extract the coordinate of the first touch TCH1 using the first distance D1 and may extract the coordinate of the second touch TCH2 using the second distance D2.

Since the second touch angle of the first touch TCH1 is equal to the second touch angle of the fourth ghost touch GTC4 and since the first touch angle of the first touch TCH1 is different from the first touch angle of the fourth ghost touch GTC4, the touch distance of the first touch TCH1 may be different from the touch distance of the fourth ghost touch GTC4. Since the second touch angle of the second touch TCH2 is equal to the second touch angle of the third ghost touch GTC3 and since the first touch angle of the second touch TCH2 is different from the first touch angle of the third ghost touch GTC3, the touch distance of the second touch TCH2 may be different from the touch distance of the third ghost touch GTC3. Thus, the coordinate calculator 320 may exactly extract the coordinate of the first touch TCH1 and the coordinate of the second touch TCH2 from the candidate coordinates xy1, xy2, xy5, and xy6 using the touch distances D1 and D2.

Figure 11:
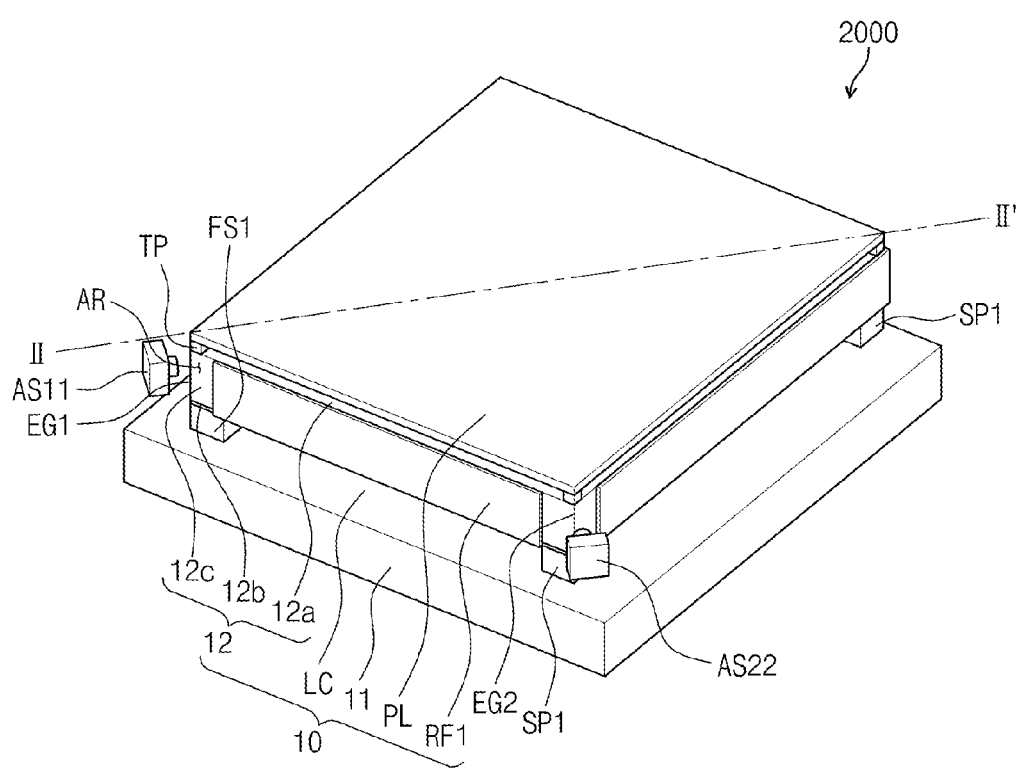
FIG. 11 is a perspective view of a touchscreen display device according to one or more embodiments of the invention.
Figure 12:
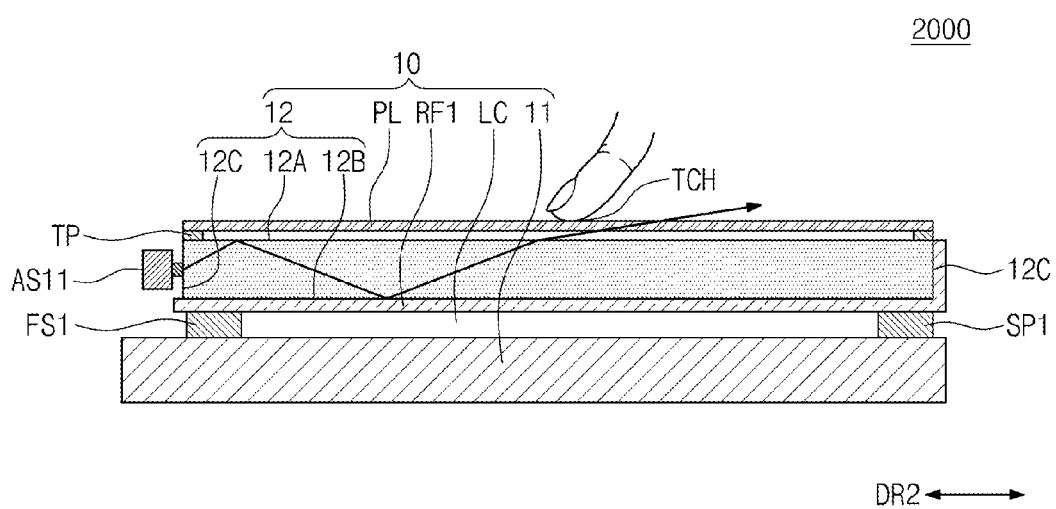
FIG. 12 is a cross-sectional view taken along a line II-IF indicated in FIG. 11.

FIG. 11 is a perspective view of a touchscreen display device 2000 (or display device 2000) according to one or more embodiments of the invention. FIG. 12 is a cross-sectional view taken along a line II-IF indicated in FIG. 11.

In one or more embodiments, the touchscreen display device 2000 in FIGS. 11 and 12 may not include a separate touch substrate SB. One or more of tasks associated with a touch substrate SB (such the tasks discussed with reference to FIGS. 1 to 3) may be performed by an upper substrate 12 of a display panel 10 of the touchscreen display device 2000.

The touch display device 2000 may include the display panel 10, a first angle sensor AS11, a second angle sensor AS22, a force sensor FS1, and a computation part (not shown) that may be analogous to the computation part CP discussed with reference to FIG. 5.

The display panel 10 may include one or more of a variety of display panels such as a liquid crystal display panel, an organic light emitting display panel, a plasma display panel, an electrophoretic display panel, an electro-wetting display panel, and so on. In one or more embodiments, the display panel 10 is a liquid crystal display panel.

The display panel 10 may include a lower substrate 11, an upper substrate 12, and a liquid crystal layer LC disposed between the lower substrate 11 and the upper substrate 12. The "lower" and the "upper" may be according to a lying position of the display device 2000.

The lower substrate 11 may include gate lines, data lines, thin film transistors, and pixel electrodes that are known to one of ordinary skill in the art. The gate lines may intersect and may be electrically insulated from the data lines. Pixel areas may be defined in a matrix formed according to the arrangements of the gate lines and the data lines. A thin film transistor may be provided in every pixel area and may be electrically connected to a pixel electrode. The lower substrate 11 may be rectangular in a plane view of the display panel 10.

The upper substrate 12 may overlap and may be opposite the lower substrate 11. The upper substrate 12 may have a common electrode for receiving a common voltage. The upper substrate 12 may have non-directionality with respect to a surface acoustic wave and may be formed of a low isotropic attenuation coefficient material. For example, the upper substrate 12 may be formed of one or more of glass, polymer, ceramic, and so on.

The upper substrate 12 may have a prism shape and/or a cuboid (or rectangular prism) shape. The upper substrate 12 may be rectangular in a plane view of the display panel 10 and may have an area smaller than that of the lower substrate 11. In one or more embodiments, as illustrated in FIGS. 11 and 12, the upper substrate 12 may have a square plate shape and may include an upper surface 12a, a lower surface 12b, and a lateral surface 12c.

The liquid crystal layer LC may be disposed between the lower surface 11 and the upper surface 12. The liquid crystal layer LC may be controlled by an electric field formed between the pixel electrode and the common electrode to transmit or block light that is incident onto the liquid crystal layer LC.

The first angle sensor AS11 may be disposed at a first corner of the upper substrate 12. In FIGS. 11 and 12, as an example, the first angle sensor AS11 may overlap the lateral surface 12c of the upper substrate 12 in a second direction DR2 and may be adjacent to a first edge EG1 of the upper substrate 12.

The second angle sensor AS22 may be disposed at a second corner of the upper substrate 12 that is adjacent to the first corner of the upper substrate 12. The second angle sensor AS22 may be spaced apart from the first angle sensor AS11. The second angle sensor AS22 may overlap the lateral surface 12c of the upper substrate 12 in the second direction DR2 and may be adjacent to a second edge EG2 of the upper substrate 12. The first edge EG1 and the second edge EG2 may represent two opposite sides of the lateral surface 12c and may be substantially perpendicular to the upper surface 12a of the upper substrate 12.

Each of the angle sensors AS11 and AS22 may include an infrared camera.

The infrared camera may include a light output portion and a light input portion.

The light output portion may have an angle of view set to be parallel to the upper surface 12a of the upper substrate 12 and may output an infrared light within the angle of view. The output infrared light may progress through an interior portion of the upper substrate 12. The light output portion may (sequentially) emit infrared light beams that are at various angles with respect to the lateral surface 12b.

The light output portion may output the infrared light such that at least an initial progress path of the infrared light is at a specific angle with respect to the upper surface 12a of the upper substrate 12. The specific angle may be an angle at which the output infrared light is substantially totally reflected at the upper surface 12a. The output infrared light may be substantially total reflected at the upper surface 12a and at the lower surface 12b of the upper substrate 12 to progress through the interior portion of the upper substrate 12.

The light input portion may receive a (reflected) part of the infrared light output from the light output portion.

If the upper surface 12a of the upper substrate 12 is touched by a user or, given that a polarization plate PL covers the upper surface 12a, if a portion of the polarization plate PL is touched by a user, a medium overlapping the upper surface 12a of the upper substrate 12 may vary. Therefore, a reflection condition at the touch point may vary. As a result, the output infrared light may not be sufficiently totally reflected at the upper surface 12a of the upper substrate 12. For example, the output infrared light may be leaked at the touch point at (and/or overlapping) the upper surface 12a of the upper substrate 12. Consequently, the amount of infrared light received by the light input portion may be substantially (and rapidly) reduced.

The infrared camera may sense a touch and a touch angle by comparing the amount of infrared light output from the light output portion within the angle of view with the amount of (reflected) infrared light received by the light input portion.

The display panel 10 may further comprise a polarization plate PL.

The polarization plate PL may be disposed on the upper surface 12a of the upper substrate 12. The polarization plate PL may filter external light and therefore may prevent sensing errors caused by external light.

The polarization plate PL may be attached to the upper substrate 12 through one or more adhesive tapes TP provided at one or more corners (and/or one or more edges) of the upper surface 12a of the upper substrate 12. Between the polarization plate PL and the upper substrate 12, a space may be formed given the thickness of the one or more adhesive tapes TP. In one or more embodiments, a plurality of transparent spacers may be provided between the upper substrate 12 and the polarization plate PL to support the polarization plate PL for preventing substantial deformation of the polarization plate PL.

In one or more embodiments, a substantial portion of the space between the polarization plate PL and the upper substrate 12 may be filled by air; therefore, the primary medium contacting the upper surface 12a of the upper substrate 12 may be air. The refractive index of air may be substantially smaller than the refractive index of the upper substrate; therefore, the output infrared light may be substantially totally reflected in the internal portion of the upper substrate 12.

The display panel 10 may further comprise a reflection layer RF1 at least partially enclosing the upper substrate 12.

The reflection layer RF1 may substantially overlap (or cover) the lower surface 12b of the upper substrate 12. The reflection layer RF1 may substantially cover the lateral surface 12c of the upper substrate 12 except aperture areas AR where infrared light beams output from the infrared cameras pass through and/or where infrared light pass through to be received by the infrared cameras.

The reflection layer RF1 may increase the amount of the output infrared light reflected when the output infrared light reaches the lower surface 12b and lateral surfaces 12c of the upper substrate 12. The reflection layer RF1 may increase reflectivity of the lower surface 12b of the upper substrate 12 such that the output infrared light reflected by the upper surface 12a also may be increased.

In one or more embodiments, the touch display device 2000 may further comprise a frame that may be analogous to the frame TF discussed with reference to FIGS. 1 to 4. The angle sensors AS11 may be disposed inside the frame, and the frame may be connected to at least one of the upper substrate 12 and the lower substrate 11.

The force sensor FS1 may be disposed at a corner (and/or an edge) of the upper substrate 12 and may be disposed between the upper substrate 12 and the lower substrate 11. In FIGS. 11 and 12, as an example, the force sensor FS1 is disposed to correspond to the first edge EG1 and overlaps an adhesive tape TP.

The display panel 10 may further comprise a supporter SP1.

The supporter SP1 may be spaced apart from the force sensor FS1 and may be disposed between the upper substrate 12 and the lower substrate 11. The supporter SP1 may be disposed to correspond to a corner and/or an edge of the upper substrate 12.

The display device 2000 may include a plurality of supporter SP1. Each of the supporters may have the same height as that of the force sensor FS1. In FIGS. 11 and 12, as an example, three supporters SP1 are disposed at three corners and/or three edges of the upper substrate 12 but not disposed at the first corner or the first edge EG1, where the force sensor FS1 is disposed.

The supporters SP1 and the force sensor FS1 may maintain a cell gap between the upper substrate 12 and the lower surface 11.

If a touch TCH is made by a user, the first angle sensor AS11 may sense a first touch angle of the touch TCH and may provide the first touch angle to a computation part that may be analogous to the computation part CP discussed with reference to FIG. 5. The second angle sensor AS22 may sense a second touch angle of the touch TCH and may provide the second touch angle to the computation part. The force sensor FS1 may calculate a touch distance (i.e., a distance between the force sensor FS1 and the touch TCH), may calculate the magnitude of a sensor force (i.e., the magnitude of a force received by the force sensor FS), and may provide related data to the computation part. The computation part may perform one or more tasks or steps described above with reference to FIGS. 5 to 10.

Figure 13:
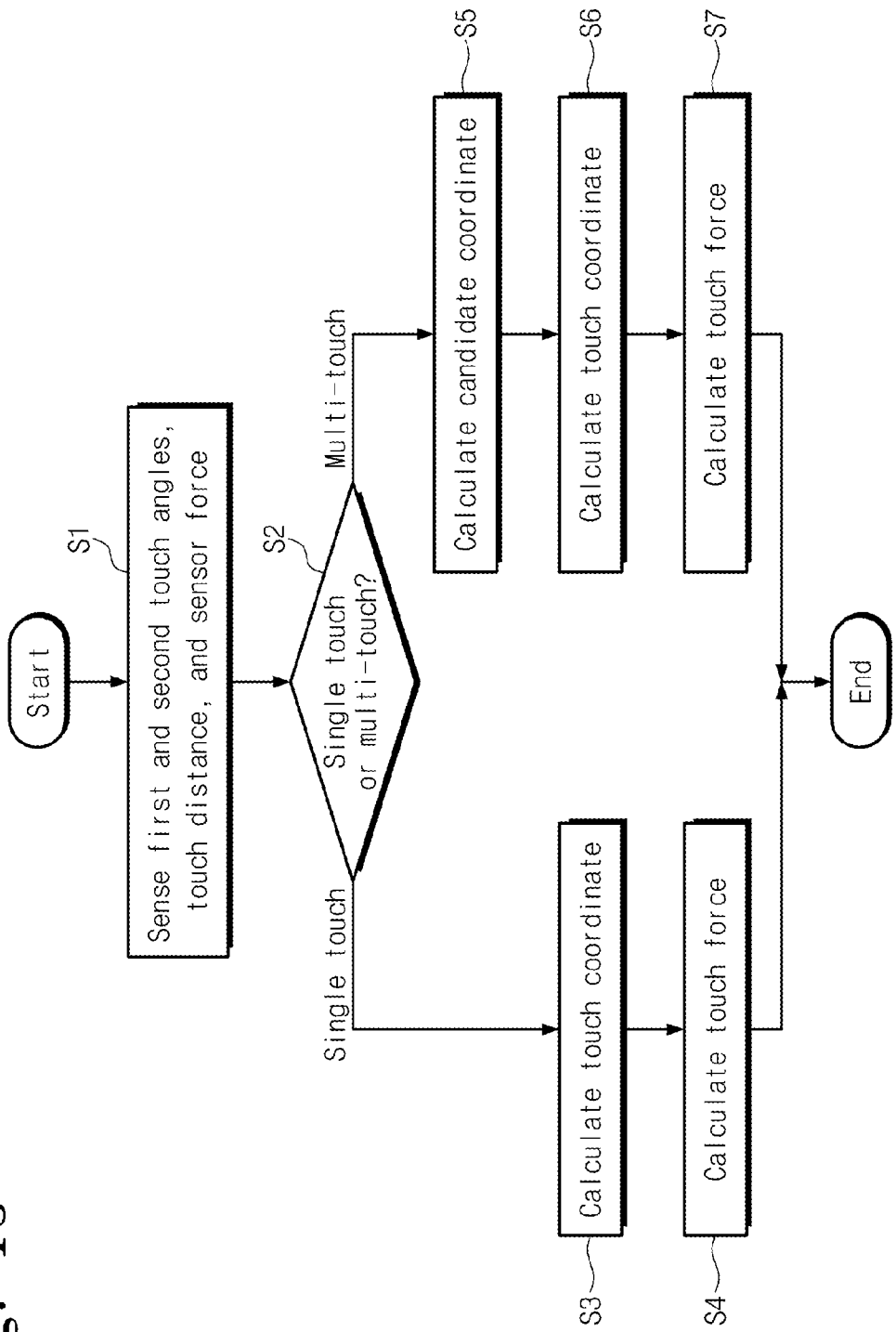
FIG. 13 is a flow chart illustrating a touch coordinate and touch force calculating method (or process) of a touchscreen display device according to one or more embodiments of the invention.

In the touch display device 2000, the angle sensors AS11 and AS22 and the force sensor FS1 may be provided in the display panel. The touch display device 2000 may not require a separate touch substrate, and the thickness of the display device 2000 may be minimized FIG. 13 is a flow chart illustrating a touch coordinate and touch force calculating method (or process) of a touchscreen display device according to one or more embodiments of the invention.

If a touch is made by a user, a first touch angle, a second touch angle, a touch distance, and a sensor force may be sensed and/or determined (S1). The first touch angle may be sensed by a first angle sensor, the touch angle may be sensed by a second angle sensor, and the touch distance and the sensor force may be determined by a force sensor.

Whether the touch is a single touch or a multi-touch (which includes a plurality of simultaneous touches at different touch points) may be determined (S2). Whether the touch is a single touch or a multi-touch may be determined according to one or more of the number of first touch angles, the number of second touch angles, the number of sensor forces, and the number of touch distances.

If the touch is the single touch, the touch coordinate may be calculated by coordinate computation part (S3). In one or more embodiments, the touch coordinate may be calculated using two of the first touch angle, the second touch angle, and the touch distance. In one or more embodiments, the touch coordinate may be calculated and/or determined using all three of the first touch angle, the second touch angle, and the touch distance.

A touch force may be calculated using the touch coordinate, the sensor force, and the touch distance (S4). The touch force may be calculated (e.g., by the computation part) using the touch distance and the sensor force. In one or more embodiments, the step S4 may be performed after the step S3. In one or more embodiments, the step S4 may be performed before the step S3. In one or more embodiments, the step S4 and the step S3 may be performed substantially simultaneously such that the generated data may be substantially simultaneously utilized in an application.

If the touch is the multi-touch, candidate coordinates of the multi-touch may be calculated (S5). Each candidate coordinates may be calculated (e.g., by the computation part) using two of a first touch angle, a second touch angle, and a touch distance. In one or more embodiments, each candidate coordinate may be calculated and/or determined using all three of a first touch angle, a second touch angle, and a touch distance.

Touch coordinates (which represent actual coordinates of the multi-touch) may be selected (e.g., by the computation part) from among the candidate coordinates (S6). The touch coordinates may be determined using the relevant remaining ones of the first touch angles, the second touch angles, and the touch distances that are not used in calculating the candidate coordinates.

Touch forces associated with the touch coordinates may be calculated using the touch coordinates, the sensor forces, and the touch distances (S7). In one or more embodiments, the touch force may be calculated (e.g., by the computation part) using the touch distances and the sensor forces. In one or more embodiments, the step S7 may be performed after at least one of the steps S5 and S6. It is required that the touch force of the touch coordinate, not a touch force of a ghost coordinate. Therefore, the step S7 performing after the step S6 is advantageous for calculation load. In one or more embodiments, the step S7 may be performed before at least one of the steps S5 and S6. In one or more embodiments, the step S7 and at least one of the steps S5 and S6 may be performed substantially simultaneously such that the generated data may be substantially simultaneously utilized in an application.

While the invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A display device, comprising:
a display element configured to display images;
a touch substrate at which a touch is generated, wherein the touch substrate overlaps the display element;
a first angle sensor disposed at a first corner of the touch substrate for determining a first touch angle related to the touch;
a second angle sensor disposed at a second corner of the touch substrate for determining a second touch angle related to the touch;
a force sensor disposed at the first corner of the touch substrate corresponding to the first angle sensor for determining a distance from the force sensor to the touch; and
a computation part configured to determine a touch coordinate associated with the touch based on the first touch angle determined by the first angle sensor, the second touch angle determined by the second angle sensor, and the distance determined by the force sensor.

2. The display device of claim 1, wherein the force sensor is further configured to calculate a magnitude of a sensor force received at the force sensor, and wherein at least one of the force sensor and the computation part is further configured to calculate a magnitude of a touch force received at the touch point and related to the touch based on the distance and the sensor force.

3. The display device of claim 1, wherein the first angle sensor includes an infrared camera, and
wherein the infrared camera comprises a light output portion for outputting an output infrared light and a light input portion for receiving a reflected infrared light that is resulted from the output infrared light.

4. The display device of claim 1, wherein the force sensor comprises:
a sensor resistor having a resistance that is configured to vary according to a sensor force received at the sensor resistor;
a filter resistor having a constant resistance value and connected in series to the sensor resistor; and
a force sensing part connected to a node that is connected between the sensor resistor and the filter resistor,
wherein the sensor resistor and the filter resistor are configured for dividing a reference voltage to provide a division voltage at the node, and wherein the force sensing part is configured to determine the sensor force using a value of the a division voltage.

5. The display device of claim 4, wherein the force sensor senses an arrival time of a surface acoustic wave generated by the touch and the touch distance is calculated by:

$$D = v \times \Delta t$$

wherein D indicates the touch distance, v indicates a transfer speed of the surface acoustic wave, $\Delta t$ indicates the arrival taken for the surface acoustic wave to reach the force sensor.

6. The display device of claim 1, wherein the first angle sensor overlaps the force sensor in a direction perpendicular to a surface of the touch substrate.

7. The display device of claim 1, further comprising:
a frame disposed on the touch substrate, having an opening, and including an inner wall for reflecting infrared light provided by at least one of the first angle sensor and the second angle sensor.

8. The display device of claim 7, wherein the frame includes a cavity, and wherein the first angle sensor is disposed inside the cavity.

9. The display device of claim 7, further comprising:
a reflection plate disposed at the inner wall for reflecting the infrared light.

10. The display device of claim 1, further comprising:
a supporter disposed at the second corner of the touch substrate, wherein a height of the supporter is equal to a height of the force sensor.

11. The display device of claim 1, wherein the computation part comprises:
- a candidate coordinate calculator configured to calculate a first candidate coordinate related to the touch using two of the first touch angle, the second touch angle, and the distance, the candidate coordinate calculated being further configured to calculate a second candidate coordinate;
- a coordinate calculator configured to select the touch coordinate from the first candidate coordinate and the second candidate coordinate using the remaining one of the first touch angle, the second touch angle, and the touch distance; and
- a touch force calculator configured to calculate the touch force based on the touch distance and the sensor force.

12. The display device of claim 11, wherein the candidate coordinate calculator calculates the candidate coordinate by:

$$xy=(D\cdot\cos(\theta),D\cdot\sin(\theta))$$

wherein xy indicates the candidate coordinate, D indicates the touch distance, and θ indicates the first touch angle.

13. The display device of claim 12, wherein the coordinate calculator is configured to select the touch coordinate from the first candidate coordinate and the second candidate coordinate using the second touch angle.

14. The display device of claim 11, wherein the candidate coordinate calculator calculates the candidate coordinate by:

$$xy = \left( \frac{-\tan(\Phi)\cdot W}{\tan(\theta)-\tan(\Phi)}, \frac{-\tan(\theta)\cdot\tan(\Phi)\cdot W}{\tan(\theta)-\tan(\Phi)} \right)$$

wherein xy indicates the candidate coordinate, θ indicates the first touch angle, Φ indicates the second touch angle, and W indicates a width of the touch substrate in a first direction.

15. The display device of claim 14, wherein the coordinate calculator is configured to select the touch coordinate from the first candidate coordinate and the second candidate coordinate using the distance.

16. The touch display device of claim 11, wherein the touch force calculator calculates the touch force by:

$$F1=F2\times(1+a\cdot D^2)$$

wherein F1 indicates the touch force, F2 indicates the sensor force, a indicates a proportional constant, and D indicates the touch distance.

17. The display device of claim 1, comprising:
a base substrate, wherein the display element is disposed between the touch substrate and the base substrate, and wherein the force sensor is disposed between the touch substrate and the base substrate.

18. The display device of claim 17, wherein the first angle sensor is external to the touch substrate and overlaps the base substrate in a direction perpendicular to the base substrate.

19. The display device of claim 17, further comprising:
a polarization plate overlapping the touch substrate, wherein a space between the touch substrate and the polarization plate is filled with air.

20. The display device of claim 17, further comprising:
a reflection layer including a first portion disposed at and overlapping a first surface of the touch substrate and disposed between the touch substrate and the base substrate for reflecting a first part of an infrared light provided by the first angle sensor.

21. The display device of claim 20, wherein the reflection layer further includes a second portion perpendicular to the first portion and overlapping a second surface of the touch substrate for reflecting a second part of an infrared light provided by the first angle sensor.

22. A method for operating a display device, the method comprising:
- sensing, using a first angle sensor disposed at a first corner of a touch substrate, a first touch angle related to a touch;
- sensing, using a second angle sensor disposed at a second corner of the touch substrate, a second touch angle related to the touch;
- determining, using a force sensor disposed at the first corner of the touch substrate corresponding to the first angle sensor, a distance from the touch to the force sensor;
- determining, using the force sensor, a magnitude of a sensor force related to the touch and received at the force sensor;
- determining, using a computation part, a touch coordinate related to the touch using the first touch angle sensed by the first angle sensor, the second touch angle sensed by the second angle sensor, and the distance determined by the force sensor; and
- determining, using at least one of the computation part and the force sensor, a magnitude of a touch force related to the touch using the magnitude of the sensor force and the distance.

23. The method of claim 22, further comprising:
calculating a first candidate coordinate using the computation part and two of the first touch angle, the second touch angle, and the distance without using a remaining one of the first touch angle, the second touch angle, and the distance;
calculating a second candidate coordinate using at least the computation part; and
selecting the touch coordinate from the first candidate coordinate and the second candidate coordinate using the computation part and the remaining one of the first touch angle, the second touch angle, and the distance.

* * * * *